United States Patent
Shiromaru

(10) Patent No.: US 7,067,652 B2
(45) Date of Patent: Jun. 27, 2006

(54) COPPER PHTHALOCYANINE/IODINE INTERMOLECULAR COMPOUND AND PROCESS FOR THE PRODUCTION THEREOF

(75) Inventor: Osamu Shiromaru, Tokyo (JP)

(73) Assignee: Toyo Ink Mfg. Co., Ltd., Tokyo (JP)

(*) Notice: Subject to any disclaimer, the term of this patent is extended or adjusted under 35 U.S.C. 154(b) by 27 days.

(21) Appl. No.: 11/086,363

(22) Filed: Mar. 23, 2005

(65) Prior Publication Data

US 2005/0215779 A1  Sep. 29, 2005

(30) Foreign Application Priority Data

Mar. 26, 2004 (JP) ............................... 2004-091536
Dec. 3, 2004 (JP) ............................... 2004-350739

(51) Int. Cl.
  *C09B 47/04* (2006.01)
  *C09B 62/00* (2006.01)
  *C09B 67/00* (2006.01)

(52) U.S. Cl. ...................................... 540/139; 540/140

(58) Field of Classification Search ............. 424/9.362, 424/9.61; 540/145, 139, 140; 534/15; 514/185, 514/410

See application file for complete search history.

(56) References Cited

U.S. PATENT DOCUMENTS

| | | | | |
|---|---|---|---|---|
| 2,770,629 A | * | 11/1956 | Eastes | 540/141 |
| 4,304,719 A | | 12/1981 | Wynne et al. | |
| 5,252,417 A | * | 10/1993 | Tokida et al. | 430/58.05 |
| 5,656,751 A | * | 8/1997 | Tanaka et al. | 540/128 |
| 2002/0014183 A1 | | 2/2002 | Hall-Goulle et al. | |

FOREIGN PATENT DOCUMENTS

EP    4722907 A2 *  4/1991

OTHER PUBLICATIONS

March et al. Advanced Organic Chemistry—Reactions, Mechanism and Structure, Fourth Edition John Wiley & Sons. 1992. pp. 260-263.*
Patent Abstracts of Japan, Abstract of JP 57164158, Oct. 1982.
Database WPI Section Ch, Week 198647 Derwent Publications Ltd., XP-002333329, Abstract of SU 1120686, Apr. 15, 1986.

* cited by examiner

*Primary Examiner*—Elli Peselev
(74) *Attorney, Agent, or Firm*—Wenderoth, Lind & Ponack, L.L.P.

(57) ABSTRACT

A copper phthalocyanine/iodine intermolecular compound wherein the ratio of copper phthalocyanine molecules/iodine molecules is 2.0±0.1, and a process for the production thereof.

7 Claims, 1 Drawing Sheet

COPPER PHTHALOCYANINE/IODINE INTERMOLECULAR COMPOUND AND PROCESS FOR THE PRODUCTION THEREOF

FIELD OF THE INVENTION

The present invention relates to a copper phthalocyanine/iodine intermolecular compound wherein the ratio of copper phthalocyanine molecules to iodine molecules is 2±0.1, as a material which is expected to have excellent electrical properties, and a process for the production thereof.

DESCRIPTION OF THE PRIOR ARTS

Phthalocyanines are used as an organic photoreceptor for electrophotography or a variety of sensors owing to their semiconductor physical properties. As a means for improving the electrical properties of phthalocyanine, a method in which a phthalocyanine is doped with iodine is general. For example, there are a method in which a resin binding layer having a copper phthalocyanine dispersed therein is doped with an iodine vapor for the purpose of improving a copper phthalocyanine photoreceptor for electrophotography in photoresponse (see JP-B-5-60865) and a method in which a copper phthalocyanine evaporated sensitive film is doped with an iodine vapor for the purpose of improving the sensibility of a smell sensor which utilizes a change in electrical properties against a smell (see JP-A-7-225205). The chemical doping method is poor in productivity since a copper phthalocyanine in a thin film state is exposed to an iodine vapor. Moreover, the chemical doping method has a fatal problem that since iodine as a dopant is easily eliminated at ordinary temperature, the storage stability of a product is poor.

SUMMARY OF THE INVENTION

It is an object of the present invention to improve a copper phthalocyanine/iodine intermolecular compound in thermal stability.

It is another object of the present invention to increase the productivity of a copper phthalocyanine/iodine intermolecular compound.

The present invention provides a copper phthalocyanine/iodine intermolecular compound wherein the ratio of copper phthalocyanine molecules/iodine molecules is 2±0.1.

The present invention further provides a copper phthalocyanine/iodine intermolecular compound according to the above, which has a first decomposition point of 180° C.±20° C. in a thermogravimetric analysis carried out under air atmosphere at a temperature-increasing rate of 10° C.·min$^{-1}$ and a weight decreasing rate of 0.17±0.02 at the first decomposition point.

The present invention further provides a copper phthalocyanine/iodine intermolecular compound according to the above, which has characteristic peaks at diffraction angles of 6.2°±0.02°, 8.8°±0.02° and 19.7°±0.02° in a CuKα powder X-ray diffraction profile.

The present invention further provides a process for the production of the above copper phthalocyanine/iodine intermolecular compound, which comprises heat-treating a mixture of 100 parts by weight of a copper phthalocyanine and 0.5 to 50 parts by weight of a phthalocyanine derivative and iodine in a solvent at 80 to 250° C.

The present invention further provides a process according to the above, wherein the copper phthalocyanine is α crystals alone or a mixture of α crystals and ε crystals.

The present invention further provides a process according to the above, wherein the copper phthalocyanine or the mixture of the copper phthalocyanine and the phthalocyanine derivative is obtained by an acid pasting process or an acid slurry process.

EFFECT OF THE INVENTION

Figure 1:
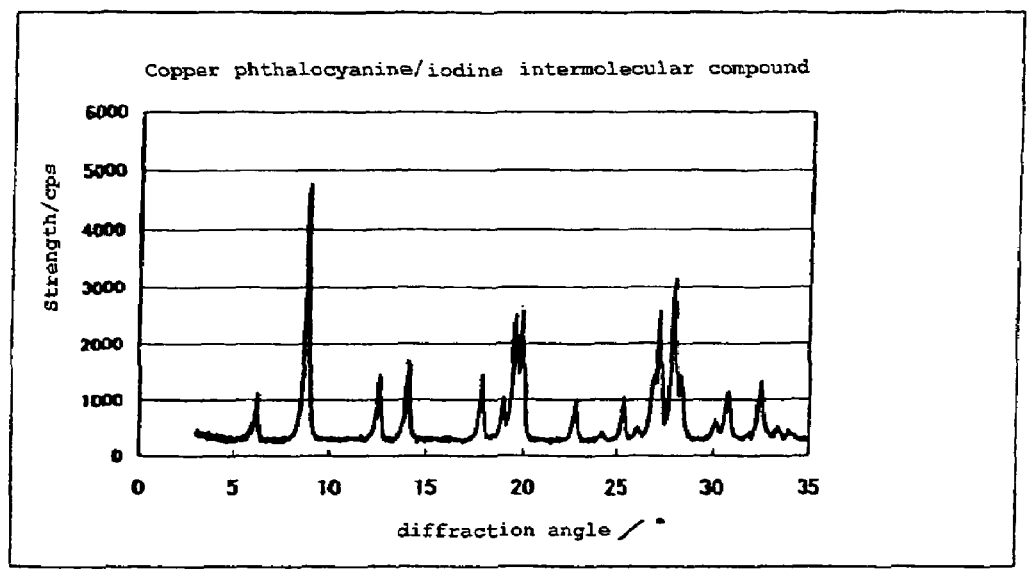
FIG. 1 shows the powder X-ray diffraction profile of a copper phthalocyanine/iodine intermolecular compound which was obtained in Example 1.

According to the present invention, there are provided a copper phthalocyanine/iodine intermolecular compound having extremely high heat resistance and a process for the production thereof.

According to the present invention, further, there is provided a process for producing a copper phthalocyanine/iodine intermolecular compound remarkably easily in industry by heat-treating a mixture of a copper phthalocyanine and a phthalocyanine derivative and iodine in a solvent.

That is, according to the present invention, there is provided a product which is extremely excellent in properties as compared with a conventional product obtained by a doping method which dopes a thin film such as an evaporated film or a coating film, and is greatly high in productivity.

DETAILED DESCRIPTION OF THE INVENTION

The phthalocyanine derivative used in the present invention is represented by the formula (1), the formula (2) or the formula (3),

MePc—[X—(CH$_2$)$_j$NR$_1$R$_2$]$_n$ (1)

wherein Me is H$_2$, Cu, Fe, Co, Ni, Zn, AlOH or FeOH, Pc is a phthalocyanine residue, X is —CH$_2$—, —CH$_2$NHCOCH$_2$—, —CO—, —SO$_2$—, —CH$_2$NH—, —CH$_2$NHCOCH$_2$NH—, —CONH— or —SO$_2$NH—, each of R$_1$ and R$_2$ is independently a hydrogen atom, an alkyl group having 1 to 18 carbon atoms, a substituted alkyl group having 1 to 18 carbon atoms, an alkenyl group having 1 to 18 carbon atoms or a substituted alkenyl group having 1 to 18 carbon atoms, or R$_1$ and R$_2$ together form a five-membered or six-membered ring which may contain a further nitrogen atom, j is an integer of 0 to 6, and n is an integer of 1 to 3,

MePc—(SO$_3$$^-$N$^+$R$_3$R$_4$R$_5$R$_6$)$_k$ (2)

wherein Me and Pc have the same meanings as those in the formula (1), each of R$_3$, R$_4$, R$_5$ and R$_6$ is independently a hydrogen atom, an alkyl group having 1 to 30 carbon atoms, a substituted alkyl group having 1 to 30 carbon atoms, an alkenyl group having 1 to 30 carbon atoms, a substituted alkenyl group having 1 to 30 carbon atoms, a polyoxy lower alkyl group or a polyoxy lower alkenyl group, provided that at least one of R$_3$, R$_4$, R$_5$ and R$_6$ is an alkyl or alkenyl group having 10 or more carbon atoms, a polyoxy lower alkyl group or a polyoxy lower alkenyl group, and k is an integer of 1 to 8, provided that the lower alkyl group and the lower alkenyl group refer to an alkyl group having 1 to 4 carbon atoms and an alkenyl group having 1 to 4 carbon atoms respectively,

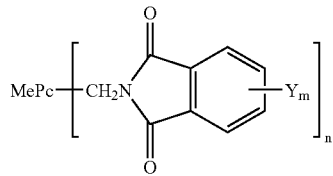

(3)

wherein Me, Pc and n have the same meanings as those in the formula (1), Y is a halogen atom, an alkyl group, a nitro group, an amino group, a sulfone group or a carboxyl group, and m is an integer of 0 to 4.

The mixture of the α crystal form copper phthalocyanine and the copper phthalocyanine derivative in the present invention is obtained by adding a copper phthalocyanine and a phthalocyanine derivative represented by the formula (1), (2) or (3) to 5 to 15 times by weight of 65 to 100% sulfuric acid, stirring the mixture for 3 to 8 hours to obtain a suspension or solution of sulfate in the sulfuric acid, and poring the suspension or solution to 30 to 50 times by weight of water.

In the present invention, the amount of the phthalocyanine derivative per 100 parts by weight of the copper phthalocyanine is 0.5 to 50 parts by weight, preferably 1 to 10 parts by weight. When the amount of the phthalocyanine derivative is smaller than the above lower limit, the effect of the addition of the phthalocyanine derivative is small. When it exceeds the above upper limit, the difference in the effect is small and it is uneconomical.

Otherwise, a copper phthalocyanine is added to 5 to 15 times by weight of 65 to 100% sulfuric acid, the mixture is stirred for 3 to 8 hours to obtain a suspension or solution of sulfate in the sulfuric acid, the suspension or solution is poured to 30 to 50 times by weight of water to obtain an α crystal form copper phthalocyanine, and the α crystal form copper phthalocyanine is dry-blended or slurry-blended with a phthalocyanine derivative represented by the formula (1), (2) or (3), thereby obtaining the mixture of the α crystal form copper phthalocyanine and the phthalocyanine derivative. Sulfuric acid is generally used as an acid for producing the α crystal form copper phthalocyanine. When a sulfuric acid having a concentration of at least eighty-odd % is used, the copper phthalocyanine is in the state of a highly-viscous solution. Therefore, this process is called "acid pasting process". On the other hand, when a sulfuric acid having a concentration of from sixty-odd % to eighty-odd % is used, the copper phthalocyanine is in the state where its sulfate is dispersed. Therefore, this process is called "acid slurry process".

The crystal form of the mixture of the copper phthalocyanine and the phthalocyanine derivative used for producing the product of the present invention is not limited to the α crystal form. For example, the δ crystal form or the γ crystal form each of which has a larger potential energy than the ε crystal form, may be used in place of the α crystal form. However, the α crystal form is industrially advantageous since it has a high potential energy and its production is easy.

The solvent for producing the product of the present invention can be selected from tertiary alkyl benzenes such as tert-butylbenzenes or tert-amylbenzenes, nitrobenzenes, alicyclic compounds such as sulfolane, and mixtures of these.

The heat-treatment temperature in the present invention is from 80 to 200° C., preferably from 120 to 180° C.

The molar ratio of the amount of the iodine used in the present invention to the total amount of phthalocyanine compounds is from 0.4 to 3.0, preferably from 0.6 to 1.2. In the present invention, the term "the total amount of phthalocyanine compounds" refers to the total amount of the copper phthalocyanine and the phthalocyanine derivative.

In the treatment with the solvent, an ε crystal form copper phthalocyanine may coexist as a seed crystal. The amount of the ε crystal form copper phthalocyanine is preferably 1/5 to 1/10 based on the total amount of the mixture of the copper phthalocyanine and the phthalocyanine derivative. It is assumed that the ε crystal form copper phthalocyanine has the function of making it easy to form the intermolecular compound of the present invention.

In the copper phthalocyanine/iodine intermolecular compound of the present invention, the ratio of copper phthalocyanine molecules to iodine molecules is 2±0.1, the first decomposition point in a thermogravimetric analysis carried out under air atmosphere at a temperature-increasing rate of 10° C.·min$^{-1}$ is 180° C.±20° C. and the weight decreasing rate at the above temperature is 0.17±0.02. As is evident from the thermogravimetric analysis, the copper phthalocyanine/iodine intermolecular compound obtained according to the process of the present invention is thermally stable at up to 160° C. at the lowest or up to approximately 180° C. For this reason, it is assumed that the molecular disposition in its crystallite is completely different from that of a copper phthalocyanine/iodine intermolecular compound which is thought to be formed by the doping method. The copper phthalocyanine/iodine intermolecular compound of the present invention has a novel crystal form having characteristic peaks at diffraction angles of 6.2°±0.02°, 8.8°±0.02° and 19.7°±0.02° in a CuK α powder X-ray diffraction profile.

The ratio of copper phthalocyaninemolecules to iodine atoms in the copper phthalocyanine/iodine intermolecular compound of the present invention is approximately 1. The iodine atoms are arrayed in parallel with a column of copper phthalocyanine molecules and contribute a one-dimensional electron transfer. In addition, it is expected that the iodine atoms contribute an increase in a two-dimensional electron transfer, in particular electron transfer in the c-axis direction.

The chemical doping method is a solid-gas reaction and iodine as a dopant is squeezed in between copper phthalocyanine molecules so that the reaction is not uniform. Therefore, it is seldom that the ratio of copper phthalocyanine molecules/iodine molecules of a product becomes an integer value and, in addition, it is difficult to re-array a generated intermolecular compound in a stable order. It is thought that for these reasons the iodine of the intermolecular compound obtained according to the chemical doping method is easily eliminated at an ordinary temperature. On the other hand, it is thought that the copper phthalocyanine/iodine intermolecular compound of the present invention is formed of crystals that are restructured as a uniform molecular aggregate, of which the ratio of copper phthalocyanine molecules/iodine molecules is an integer value and which has the most stable array, in the course of changing the molecular disposition of the α crystal form which is thermodynamically the most unstable in crystal polymorphistic copper phthalocyanines and the intermolecular compound therefore has high-temperature stability. That is, the stability of product characteristics is greatly improved by generating the compound which is different from conventional ones.

The copper phthalocyanine/iodine intermolecular compound wherein the ratio of copper phthalocyanine molecules/iodine molecules is almost 2 according to the present invention can be produced by bringing the mixture of the copper phthalocyanine and the phthalocyanine derivative into contact with the solvent in the presence of iodine.

EXAMPLE 1

84 parts by weight of a crude copper phthalocyanine and 4 parts by weight of phthalimide methylated copper phthalocyanine (the number of phthalimidemethyl groups was 1/mol) were added to 500 parts by weight of 98% sulfuric acid and the mixture was stirred for 3 hours to prepare a sulfuric acid solution. The sulfuric acid solution was poured into 4 liters of water through an aspirator. After filtering, the residual substance was washed with water and dried with hot air, to obtain an α crystal form copper phthalocyanine. The α crystal form copper phthalocyanine was pulverized.

Figure 2:
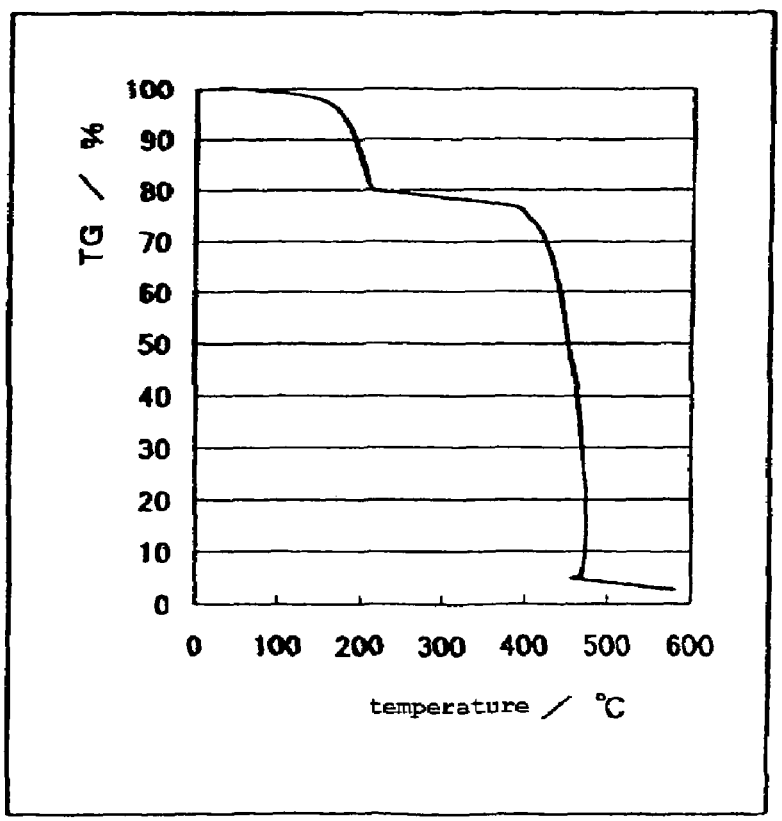
FIG. 2 shows the TG curve of a copper phthalocyanine/iodine intermolecular compound which was obtained in Example 1.

Then, the thus obtained fine α crystal form copper phthalocyanine together with 12 parts by weight of an ε crystal form copper phthalocyanine and 45 parts by weight of iodine were stirred in 1,000 parts by weight of sulfolane under heat at 150° C. for 6 hours. The mixture was cooled down to about room temperature and then poured to 1,000 parts by weight of methanol. After filtering, the residual substance was washed with methanol and dried with hot air, to obtain a copper phthalocyanine/iodine intermolecular compound. The yield thereof was 121 g. FIG. 1 shows its CuK α powder X-ray diffraction profile. FIG. 2 shows its TG curve in a thermogravimetric analysis carried out under air atmosphere at a temperature-increasing rate of 10° C.·min$^{-1}$. The first decomposition point was 180° C. and the weight decreasing rate was 0.181. From this value, the molar ratio of iodine atoms to the phthalocyanine compounds was calculated at 1.02. It was proved from the yield.

The thermogravimetric analysis was carried out according to JIS K 0129:1994 (General rules for thermal analysis).

EXAMPLE 2

73 parts by weight of a crude copper phthalocyanine was added to 500 parts by weight of 98% sulfuric acid and the mixture was stirred for 3 hours to prepare a sulfuric acid solution. The sulfuric acid solution was poured into 4 liters of water through an aspirator. After filtering, the residual substance was washed with water and dried with hot air to obtain an α crystal form copper phthalocyanine. The obtained α crystal form copper phthalocyanine was pulverized. The pulverized α crystal form copper phthalocyanine was poured to 3.5 liters of water. After filtering, the residual substance was washed with water and dried with hot air. The thus obtained α crystal form copper phthalocyanine was pulverized in a mortar. Then, the thus obtained copper phthalocyanine together with 7 parts by weight of CuPc—SO$_3^-$N$^+$H$_3$(C$_{18}$H$_{37}$), 20 parts by weight of an ε crystal form copper phthalocyanine and 35 parts by weight of ioidine were stirred in 1,000 parts by weight of sulfolane under heat at 170° C. for 3 hours. The mixture was cooled down to about room temperature and then poured to 1,000 parts by weight of methanol. After filtering, the residual substance was washed with methanol and dried with hot air to obtain a copper phthalocyanine/iodine intermolecular compound. The yield thereof was 119 g. The powder X-ray diffraction profile and the TG curve according to thermogravimetric analysis were similar to those of FIG. 1 and FIG. 2, respectively.

EXAMPLE 3

95 parts by weight of a crude copper phthalocyanine and 5 parts by weight of a phthalimide methylated copper phthalocyanine (the number of phthalimide methyl groups is 1/mol) were added to 600 parts by weight of 98% sulfuric acid and the mixture was stirred for 3 hours to obtain a sulfuric acid solution. The sulfuric acid solution was poured to 5 liters of water through an aspirator. After filtering, the residual substance was washed with water and dried with hot air. The thus obtained α crystal form copper phthalocyanine was pulverized.

The thus obtained fine α crystal form copper phthalocyanine together with 45 parts by weight of iodine were stirred in 1,000 parts by weight of sulfolane under heat at 150° C. for 6 hours. The mixture was cooled down to about room temperature and then poured to 1,000 parts by weight of methanol. After filtering, the residual substance was washed with methanol and dried with hot air, to obtain a copper phthalocyanine/iodine intermolecular compound. The yield thereof was 121 g. The CuK α powder X-ray diffraction profile was similar to FIG. 1.

What is claimed is:

1. A copper phthalocyanine/iodine intermolecular compound wherein the ratio of copper phthalocyanine molecules/iodine molecules is 2.0±0.1.

2. A copper phthalocyanine/iodine intermolecular compound according to claim 1, which has a first decomposition point of 180° C.±20° C. in a thermogravimetric analysis carried out under air atmosphere at a temperature-increasing rate of 10° C.·min$^{-1}$ and a weight decreasing rate of 0.17±0.02 at the first decomposition point.

3. A copper phthalocyanine/iodine intermolecular compound according to claim 1, which has a novel crystal form having characteristic peaks at diffraction angles of 6.2°±0.02°, 8.8°±0.02° and 19.7°±0.02° in a CuK α powder X-ray diffraction profile.

4. A process for the production of the copper phthalocyanine/iodine intermolecular compound recited in claim 1, which comprises heat-treating a mixture of 100 parts by weight of a copper phthalocyanine and 0.5 to 50 parts by weight of a phthalocyanine derivative and iodine in a solvent at 80 to 250° C. wherein the solvent is at least one selected from the group consisting of tertiary alkyl benzene, nitrobenzene, alicyclic compounds, and mixtures thereof.

5. A process according to claim 4, wherein the copper phthalocyanine is α crystals alone or a mixture of α crystals and ε crystals.

6. A process according to claim 4, wherein the copper phthalocyanine or the mixture of the copper phthalocyanine and the phthalocyanine derivative is obtained by an acid pasting process or an acid slurry process.

7. A process according to claim 4, wherein the phthalocyanine derivative is represented by the formula (1), the formula (2) or the formula (3),

$$\text{MePc—}[\text{X—}(\text{CH}_2)j\text{NR}_1\text{R}_2]n \qquad (1)$$

wherein Me is H$_2$, Cu, Fe, Co, Ni, Zn, AlOH or FeOH, Pc is a phthalocyanine residue, X is —CH$_2$—, —CH$_2$NHCOCH$_2$—, —CO—, —SO$_2$—, —CH$_2$NH—, —CH$_2$NHCOCH$_2$NH—, —CONH— or —SO$_2$NH—, each of $R_1$ and $R_2$ is independently a hydrogen atom, an alkyl group having 1 to 18 carbon atoms, a substituted alkyl group having 1 to 18 carbon atoms, an alkenyl group having 1 to 18 carbon atoms or a substituted alkenyl group having 1 to 18 carbon atoms, or $R_1$ and $R_2$ together form a five-membered or six-membered ring which may contain a further nitrogen atom, j is an integer of 0 to 6, and n is an integer of 1 to 3,

     (2)

wherein Me and Pc have the same meanings as those in the formula (1), each of $R_3$, $R_4$, $R_5$ and $R_6$ is independently a hydrogen atom, an alkyl group having 1 to 30 carbon atoms, a substituted alkyl group having 1 to 30 carbon atoms, an alkenyl group having 1 to 30 carbon atoms, a substituted alkenyl group having 1 to 30 carbon atoms, a polyoxy lower alkyl group or a polyoxy lower alkenyl group, provided that at least one of $R_3$, $R_4$, $R_5$ and $R_6$ is an alkyl or alkenyl group having 10 or more carbon atoms, a polyoxy lower alkyl group or a polyoxy lower alkenyl group, and k is an integer of 1 to 8,

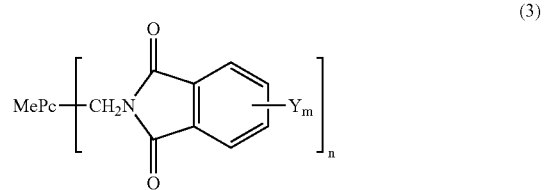

wherein Me, Pc and n have the same meanings as those in the formula (1), Y is a halogen atom, an alkyl group, a nitro group, an amino group, a sulfone group or a carboxyl group, and m is an integer of 0 to 4.

* * * * *